United States Patent
Do et al.

(10) Patent No.: US 9,143,920 B2
(45) Date of Patent: Sep. 22, 2015

(54) FINE GRAIN POSITION DATA COLLECTION

(71) Applicant: QUALCOMM Incorporated, San Diego, CA (US)

(72) Inventors: Ju-Yong Do, Palo Alto, CA (US); Saumitra Mohan Das, Santa Clara, CA (US); Sai Pradeep Venkatraman, Santa Clara, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/912,096

(22) Filed: Jun. 6, 2013

(65) Prior Publication Data

US 2014/0364101 A1  Dec. 11, 2014

(51) Int. Cl.
*H04W 24/00* (2009.01)
*H04W 8/16* (2009.01)
*H04W 4/02* (2009.01)
*G01S 5/02* (2010.01)

(52) U.S. Cl.
CPC ............... *H04W 8/16* (2013.01); *G01S 5/0252* (2013.01); *G01S 5/0263* (2013.01); *H04W 4/02* (2013.01)

(58) Field of Classification Search
CPC ........ H04W 8/16; H04W 4/02; G01S 5/0252; G01S 5/0263
USPC ............... 455/456.1, 456.2, 404.2, 418, 411, 455/414.1, 550.1, 556.1
See application file for complete search history.

(56) References Cited

U.S. PATENT DOCUMENTS

| | | | |
|---|---|---|---|
| 7,848,751 B2 | 12/2010 | Clark et al. | |
| 8,018,383 B1 | 9/2011 | Schantz et al. | |
| 8,027,659 B1 | 9/2011 | Daly et al. | |
| 2003/0125045 A1 | 7/2003 | Riley et al. | |
| 2009/0011779 A1 | 1/2009 | MacNaughtan et al. | |
| 2011/0312333 A1* | 12/2011 | I'Anson et al. | 455/456.1 |
| 2012/0029817 A1* | 2/2012 | Khorashadi et al. | 701/451 |
| 2012/0173682 A1 | 7/2012 | Mantere et al. | |
| 2012/0258670 A1 | 10/2012 | Gossain et al. | |
| 2012/0289244 A1* | 11/2012 | Goyal | 455/456.1 |
| 2013/0099971 A1* | 4/2013 | Takaoka | 342/357.74 |

(Continued)

OTHER PUBLICATIONS

Geoffrey S. Lo "Wireless Body Area Network Node Localization Using Small-Scale Spatical Information", The University of British Columia, Sep. 2012.*

(Continued)

*Primary Examiner* — Khai M Nguyen
(74) *Attorney, Agent, or Firm* — Hunter Clark PLLC (57) ABSTRACT

Method, mobile device, computer program product, and apparatus for performing Fine Grain Position Data Collection are described. In one embodiment, a server can receive position data collected by a mobile device with a first positioning configuration. In one embodiment, the server can determine, from the position data received at the server, a mobile device position and create a second positioning configuration according to at least the mobile device position. In one embodiment, the server can send the second positioning configuration to the mobile device. In one embodiment, a mobile device can collect position data according to a first positioning configuration and send the position data to a server. In one embodiment, the mobile device can receive a second positioning configuration from the server created according to at least the mobile device position.

59 Claims, 5 Drawing Sheets

(56) References Cited

U.S. PATENT DOCUMENTS

2013/0109405 A1* 5/2013 Siomina et al. ............ 455/456.1
2013/0324196 A1* 12/2013 Wang et al. .................. 455/574
2014/0349677 A1* 11/2014 Xiao et al. ................. 455/456.1

OTHER PUBLICATIONS

International Search Report and Written Opinion—PCT/US2014/039123—ISA/EPA—Oct. 8, 2014, 14 pgs.
Second Written Opinion from International Application No. PCT/US2014/039123, dated May 15, 2015, 10 pages.

* cited by examiner

FINE GRAIN POSITION DATA COLLECTION

FIELD

The subject matter disclosed herein relates generally to client and server data collection and distribution.

BACKGROUND

Electronic devices may include a variety of sensors and inputs to monitor and infer relative device position. For example, based on input received by a WiFi sensor, a device can measure Received Signal Strength Indication (RSSI) or Round Trip Time (RTT) to infer device position relative to one or more wireless access points. In another example, a Global Navigation Satellite System (GNSS) can be used to determine device position.

Data collection servers may process and redistribute position information collected by electronic devices (e.g., crowd sourcing). However, always on data collection by electronic devices may consume limited device resources while providing data to the data collection server. For example, when the device is a mobile device that uses battery power, data collection can consume some of the limited battery resource of the device as one or more sensors gather data. Furthermore, data reporting out to a collection server can also consume limited wireless bandwidth resources. For example, users may have a data bandwidth cap and may be charged excess usage fees when data use exceeds the cap. Therefore, users may be hesitant to allow their devices to provide unrestricted data reporting to data collection servers.

The cost of data collection can impact data collection servers as well as clients or connected devices. For example, too much traffic to a server can consume a server's bandwidth and excess data may not add value commensurate with the cost of a large unmanaged data flow. Blind data collection can be wasteful and expensive especially when multiplied by many client devices. If the server becomes overwhelmed with connections, incoming and outgoing data may be dropped and the user experience at the device may be negatively impacted.

SUMMARY

Embodiments disclosed herein may relate to a method of performing Fine Grain Position Data Collection by a server. In one embodiment, the server can receive position data collected by a mobile device with a first positioning configuration. In one embodiment, the server can determine, from the position data received at the server, a first position of the mobile device and create a second positioning configuration according to at least the mobile device position. In one embodiment, the server can send the second positioning configuration to the mobile device.

Embodiments disclosed herein may relate to a method of performing Fine Grain Position Data Collection by a mobile device. In one embodiment, a mobile device can collect position data according to a first positioning configuration and send the position data to a server. In one embodiment, the mobile device can receive a second positioning configuration from the server created according to at least the mobile device position.

Embodiments disclosed herein may relate to a device for performing Fine Grain Position Data Collection by a server. In one embodiment, a server can receive position data collected by a mobile device with a first positioning configuration. In one embodiment, the server can determine, from the position data received at the server, a first position of the mobile device and create a second positioning configuration according to at least the mobile device position. In one embodiment, the server can send the second positioning configuration to the mobile device.

Embodiments disclosed herein may relate to a device for performing Fine Grain Position Data Collection by a mobile device. In one embodiment, a mobile device can collect position data according to a first positioning configuration and send the position data to a server. In one embodiment, the device can receive a second positioning configuration from the server created according to at least the mobile device position.

Embodiments disclosed herein may relate to a server to perform Fine Grain Position Data Collection, the device comprising hardware and software to receive position data collected by a mobile device with a first positioning configuration, determine, from the position data received at the device, a first position of the mobile device and create a second positioning configuration according to at least the mobile device position. In one embodiment, the device can send the second positioning configuration to the mobile device.

Embodiments disclosed herein may relate to a device to perform Fine Grain Position Data Collection. The device can collect position data according to a first positioning configuration and send the position data to a server. The device can receive a second positioning configuration from the server created according to at least the mobile device position.

Embodiments disclosed herein may relate to a non-transitory storage medium having stored thereon instructions that receive position data collected by a mobile device with a first positioning configuration, determine, from the position data received at the server, a first position of the mobile device and create a second positioning configuration according to at least the mobile device position. In one embodiment, the medium stores instructions to send the second positioning configuration to the mobile device.

Embodiments disclosed herein may relate to a non-transitory storage medium having stored thereon instructions that collect position data according to a first positioning configuration and send the position data to a server. In one embodiment, the medium stores instructions to receive a second positioning configuration from a server created according to at least the mobile device position.

DESCRIPTION

The following description and related drawings disclose specific embodiments of methods and systems. Alternate embodiments may be devised without departing from the scope of the disclosure. Additionally, well-known elements of systems and/or methods may not be described in detail or may be omitted so as not to obscure the relevant details of the disclosure.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device (e.g., a server or device). It will be recognized that various actions described herein can be performed by specific circuits (e.g., application specific integrated circuits), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
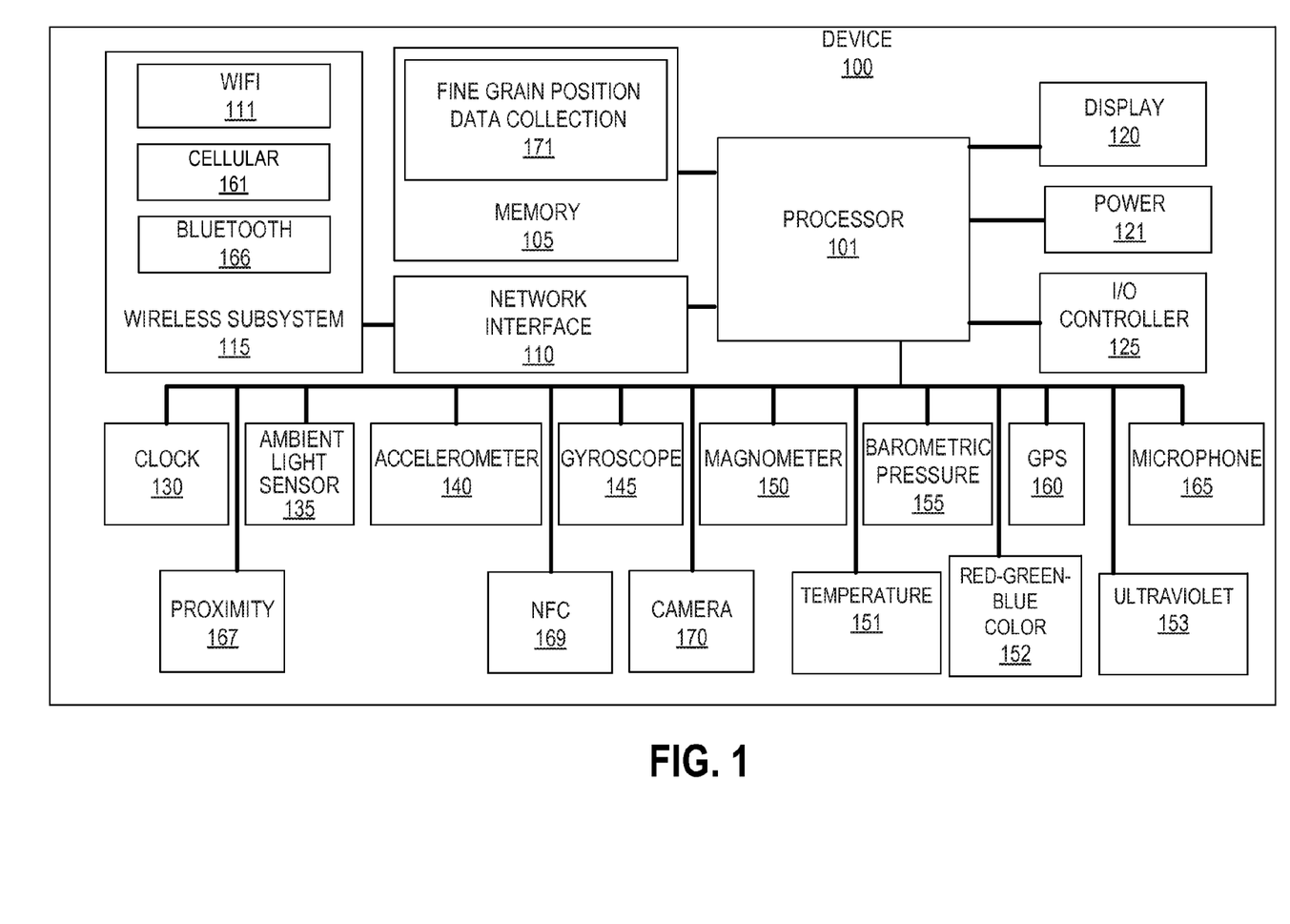
FIG. 1 is block diagram illustrating an exemplary mobile device.

FIG. 1 is block diagram illustrating an exemplary mobile device. The system may be a device (e.g., the device 100), which may include one or more processors 101, a memory 105, I/O controller 125, and network interface 110. Device 100 may also include a number of device sensors coupled to one or more buses or signal lines further coupled to the processor 101. It should be appreciated that device 100 may also include a display 120, a user interface (e.g., keyboard, touch-screen, or similar devices), a power device 121 (e.g., a battery), as well as other components typically associated with electronic devices. In some embodiments, device 100 may be a mobile or non-mobile device.

The device (e.g., device 100) can include sensors such as a clock 130, ambient light sensor (ALS) 135, accelerometer 140, gyroscope 145, magnetometer 150, temperature sensor 151, barometric pressure sensor 155, red-green-blue (RGB) color sensor 152, ultra-violet (UV) sensor 153, UV-A sensor, UV-B sensor, compass, proximity sensor 167, near field communication (NFC) 169, and/or Global Positioning Sensor (GPS) 160. As used herein the microphone 165, camera 170, and/or the wireless subsystem 115 (Bluetooth 166, WiFi 111, cellular 161) are also considered sensors used to analyze the environment (e.g., position) of the device. In some embodiments, multiple cameras are integrated or accessible to the device. For example, a mobile device may have at least a front and rear mounted camera. In some embodiments, other sensors may also have multiple installations or versions.

Memory 105 may be coupled to processor 101 to store instructions for execution by processor 101. In some embodiments, memory 105 is non-transitory. Memory 105 may also store one or more models or modules to implement embodiments described below. Memory 105 may also store data from integrated or external sensors. In addition, memory 105 may store application program interfaces (APIs) for accessing the Fine Grain Position Data Collection (FGPDC). In some embodiments, FGPDC functionality can be implemented in memory 105. In other embodiments, FGPDC functionality can be implemented as a module separate from other elements in the device 100. The FGPDC module may be wholly or partially implemented by other elements illustrated in FIG. 1, for example in the processor 101 and/or memory 105, or in one or more other elements of the device 100. Additional details regarding implementation of FGPDC functionality are described below.

Network interface 110 may also be coupled to a number of wireless subsystems 115 (e.g., Bluetooth 166, WiFi 111, Cellular 161, or other networks) to transmit and receive data streams through a wireless link to/from a wireless network, or may be a wired interface for direct connection to networks (e.g., the Internet, Ethernet, or other wireless systems). The mobile device may include one or more local area network transceivers connected to one or more antennas. The local area network transceiver comprises suitable devices, hardware, and/or software for communicating with and/or detecting signals to/from WAPs, and/or directly with other wireless devices within a network. In one aspect, the local area network transceiver may comprise a WiFi (802.11x) communication system suitable for communicating with one or more wireless access points.

The device 100 may also include one or more wide area network transceiver(s) that may be connected to one or more antennas. The wide area network transceiver comprises suitable devices, hardware, and/or software for communicating with and/or detecting signals to/from other wireless devices within a network. In one aspect, the wide area network transceiver may comprise a CDMA communication system suitable for communicating with a CDMA network of wireless base stations; however in other aspects, the wireless communication system may comprise another type of cellular telephony network or femtocells, such as, for example, TDMA, LTE, Advanced LTE, WCDMA, UMTS, 4G, or GSM. Additionally, any other type of wireless networking technologies may be used, for example, WiMax (802.16), Ultra Wide Band, ZigBee, wireless USB, etc. In conventional digital cellular networks, position location capability can be provided by various time and/or phase measurement techniques. For example, in CDMA networks, one position determination approach used is Advanced Forward Link Trilateration (AFLT). Using AFLT, a server may compute its position from phase measurements of pilot signals transmitted from a plurality of base stations.

Thus, device 100 may be a: mobile device, wireless device, cell phone, personal digital assistant, mobile computer, wearable device (e.g., head mounted display, virtual reality glasses, etc.), robot navigation system, tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, the device 100 may include a radio device, a cellular telephone device, a computing device, a personal communication system device, or other like movable wireless communication equipped device, appliance, or machine. The term "mobile device" is also intended to include devices which communicate with a personal navigation device, such as by short-range wireless, infrared, wire line connection, or other connection—regardless of whether satellite signal reception, assistance data reception, and/or position-related processing occurs at the device 100. Also, "mobile device" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

The mobile device may communicate wirelessly with a plurality of WAPs using RF signals (e.g., 2.4 GHz, 3.6 GHz, and 4.9/5.0 GHz bands) and standardized protocols for the modulation of the RF signals and the exchanging of information packets (e.g., IEEE 802.11x). By extracting different types of information from the exchanged signals, and utilizing the layout of the network (i.e., the network geometry) the mobile device may determine position within a predefined reference coordinate system.

Embodiments as will be hereinafter described may be implemented through the execution of instructions, for example as stored in the memory 105 or other element, by processor 101 of device and/or other circuitry of device and/or other devices. Particularly, circuitry of device, including but not limited to processor 101, may operate under the control of a program, routine, or the execution of instructions to execute methods or processes in accordance with embodiments of the disclosure. For example, such a program may be implemented in firmware or software (e.g. stored in memory 105 and/or other locations) and may be implemented by processors, such as processor 101, and/or other circuitry of device. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by device itself and/or some or all of the functions, engines or modules described herein may be performed by another system connected through I/O controller 125 or network interface 110 (wirelessly or wired) to device. Thus, some and/or all of the functions may be performed by another system and the results or intermediate calculations may be transferred back to device. In some embodiments, such other device may comprise a server (e.g., server 200) configured to process information in real time or near real time. In some embodiments, the other device is configured to predetermine the results, for example based on a known configuration of the device. Further, one or more of the elements illustrated in FIG. 1 may be omitted from the device 100. For example, one or more of the sensors 130-165 may be omitted in some embodiments.

Figure 2:
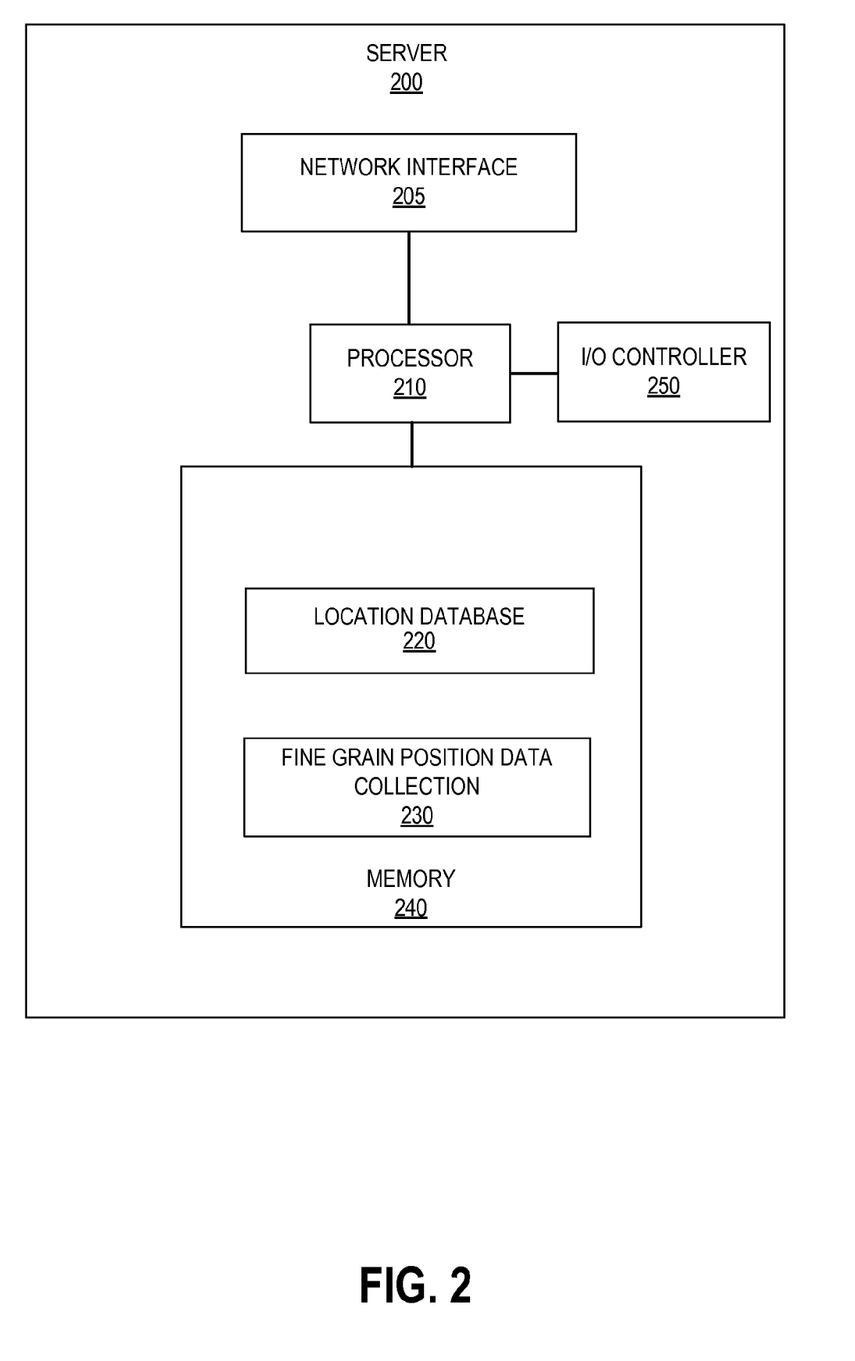
FIG. 2 is block diagram illustrating an exemplary server.

FIG. 2 is block diagram illustrating an exemplary server 200. For the sake of simplicity, the various features and functions illustrated in the box diagram of FIG. 2 are connected together using a common bus meant to represent that these various features and functions are operatively coupled together. Those skilled in the art will recognize that other connections, mechanisms, features, functions, or the like, may be provided and adapted as necessary to operatively couple and configure a data processing system (e.g., server 200). Further, it is also recognized that one or more of the features or functions illustrated may be further subdivided or combined.

The server 200 may include a network interface 210 configured to communicate with a network (not shown), which may be configured to communicate with other servers, computers, and devices (e.g., device 100).

A processor 210 may be connected to the network interface 205, and the memory 240. The processor may include one or more microprocessors, microcontrollers, and/or digital signal processors that provide processing functions, as well as other calculation and control functionality. The memory 240 can store data and software instructions for executing programmed functionality within the server. The memory 240 may be on-board the processor 210 (e.g., within the same IC package), and/or the memory may be external memory to the processor and functionally coupled over a data bus. The details of software functionality associated with aspects of the disclosure will be discussed in more detail below.

A number of software modules or data tables may reside in memory 240 and be utilized by the processor 210 in order to manage communications, and FGPDC functionality. As illustrated in FIG. 2, memory 240 may include location database 220, and the FGPDC 230. One should appreciate that the organization of the memory contents as shown in FIG. 2 is merely exemplary, and as such the functionality of the modules and/or data structures may be combined, separated, and/or be structured in different ways depending upon the implementation of the mobile device. In one embodiment, FGPDC 230 may be a process running on the processor 210 of the server 200, which provides for enhanced data collection.

The server may optionally store auxiliary position/motion data in memory that may be derived from information received from various sources at the device 100 as described below. Moreover, in other embodiments, supplemental information may include, but not be limited to, information that can be derived or based upon Bluetooth signals, beacons, RFID tags, and/or information derived from a map (e.g., receiving coordinates from a digital representation of a geographical map by, for example, a user interacting with a digital map).

Processor 210 may include any form of logic suitable for performing at least the techniques provided herein. For example, processor 210 may be operatively configurable based on instructions in memory 240 to selectively initiate one or more routines that exploit motion data for use in other portions of the mobile device.

The server may include an input/output controller 250 to provide any suitable interface systems, such as a microphone/speaker, keypad, and display that allows for local input to the server.

Figure 3:
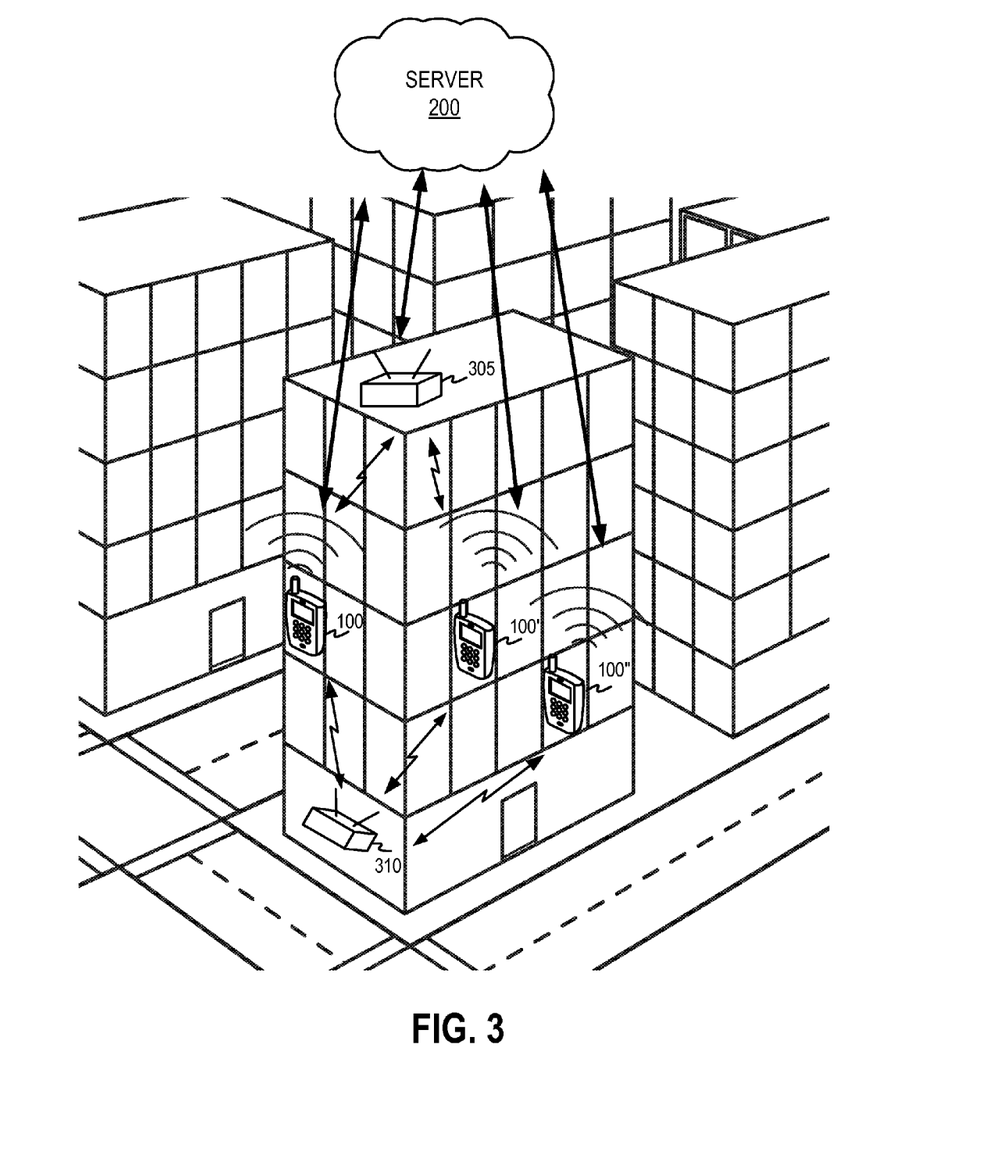
FIG. 3 is block diagram illustrating an exemplary operating environment of the mobile device and server.

FIG. 3 is a diagram of an exemplary operating environment for a mobile device 100 and server 200 performing Fine Grain Position Data Collection. In one embodiment, one or more mobile devices (e.g., devices 100, 100', and 100") can collect position data and upload position data to a server (e.g., server 200). In one embodiment, position data is the data relevant to inferring or determining position or location. Each mobile device can collect position data from one or more of its available device sensors (e.g., ambient light sensor (ALS) 135, accelerometer 140, gyroscope 145, magnetometer 150, temperature sensor 151, barometric pressure sensor 155, red-green-blue (RGB) color sensor 152, ultra-violet (UV) sensor 153, NFC 169, UV-A sensor, UV-B sensor, compass, Bluetooth 166, WiFi 111, cellular 161, proximity sensor 167 and/or Global Positioning Sensor (GPS) 160). In some embodiments, the mobile device determines positioning based on communication with one or more Wireless Access Points (e.g., 305, and 310). In some embodiments, the Wireless Access Points may also provide updates or requests for data to the server 200.

The WAPs 305 and 310 can be part of a Wireless Network (e.g., Wireless Local Area Network, Wide Area Network, etc.), which may operate in buildings and perform communications over a relatively small geographic region compared to a Cellular or Wide Area Network. Such WAPs may be part of, for example, WiFi networks (802.11x).

In one embodiment, each WAP may be, for example, a WiFi wireless access point, which is not necessarily set in a fixed position and can change location. In one embodiment, the mobile device position may be determined by having the mobile device receive signals from each WAP. Each signal may be associated with its originating WAP based upon some form of identifying information that may be included in the received signal (such as, for example, a MAC address). The mobile device may then derive the time delays associated with each of the received signals. In one embodiment, the mobile device 100 can determine its placement within a building or floor of a building.

In one embodiment, Fine Grain Position Data Collection (FGPDC) makes efficient use of mobile device bandwidth, processing, and power resources when collecting data from one or more mobile devices (e.g., device 100). In one embodiment, the collected data may be position data related to the location of the respective mobile device.

Figure 4:
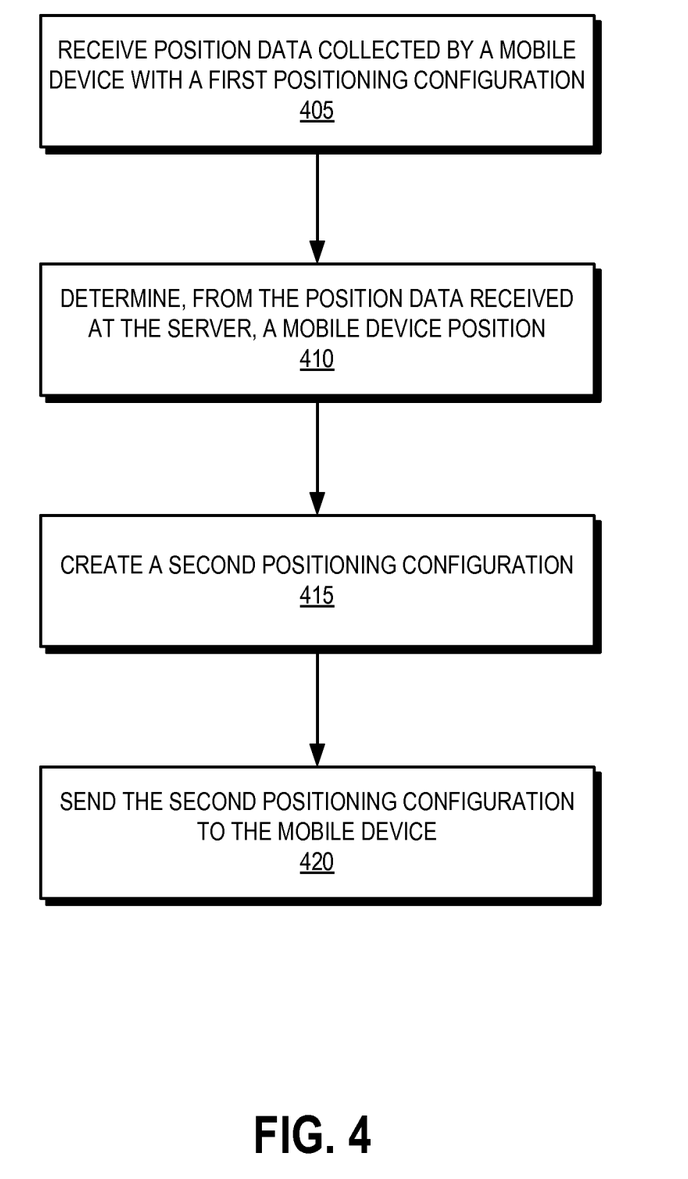
FIG. 4 is a flow diagram illustrating an exemplary method of Fine Grain Position Data Collection performed at a server.

FIG. 4 is a flow diagram illustrating an exemplary method of Fine Grain Position Data Collection performed a server (e.g., server 200). At block 405, an embodiment (e.g., FGPDC at the server) can receive position data collected by a mobile device with a first positioning configuration. The FGPDC at the server can receive position data from one or more mobile devices, each device having a respective positioning configuration with parameters for one or more mobile device sensors.

For example, device "A" may have WiFi, GPS, two cameras, NFC and Bluetooth. Device "A" may be initially configured to use WiFi to gather position data while the other available sensors remain inactive. Device "B" may be limited to WiFi and one camera sensor, and also may use WiFi to gather position data while the camera remains inactive. Accordingly, the server may initially receive WiFi data from both device "A" and device "B." Alternatively, the server may receive GPS data from device "A" while camera and WiFi data from device "B" is also sent to the server, or any number of other initial sensor data combinations may used to gather and send data from the device to the server.

At block 410, the embodiment can determine, from the position data received at the server, a mobile device position. For example, based on position data that includes WiFi identifiers, RSSI, and RTT, the server may compare the position data to data within a location database accessible by the server (e.g., location database 220). The server may be able to determine the location of the mobile device based on received position data. For example, the server can determine device location if the position data matches Location Data within the location database. Location Data is described in greater detail below. In other embodiments, the server need not determine an exact location of the mobile device to incorporate position data into the location database. For example, the server may determine a user is within a general location, such as within a building, and that data received can be associated with Location Data for the respective building.

At block 415, the embodiment can create a second positioning configuration created according to at least the mobile device position. For example, the server can determine, based on a current device position, that the mobile device is on a particular floor of a specific building and further determine whether additional data collection for the particular floor of the building is needed. In one embodiment, the server may trigger a request for additional data collection is useful based on a number of factors (e.g., a change in received position data from previously collected position data, a request associated with a location, a change in positioning performance of the mobile device, or an amount of time elapsed since a previous position data collection by the server).

Upon determining a need for additional information for the respective location, the server may request additional data collection from the mobile device. For example, while the previous device configuration may be configured for WiFi data, a new configuration may be suggested to the device that includes camera data collection or some other sensor data. The server may determine that additional WiFi data or other additional/new sensor data can build up the server's location database. For example, the server may request device "B" turn on the camera sensor to capture images of the local environment of the mobile device. The images or a representation of the images may be sent to the server for analysis and storage in the location database.

At block 420, the embodiment can send, by the server, the second positioning configuration to the mobile device. In one embodiment, when the server requests additional or customized data collection from a mobile device, the request includes a recommended device configuration for providing position data to the server. For example, the server may request camera images, and provide a recommended mobile device configuration that includes activating the camera sensor of the mobile device, while de-activating WiFi, if sufficient WiFi data has already been collected by the mobile device or by other previous mobile devices.

A device 100 utilizing FGPDC functionality can automatically send/receive updates to/from a server. For example, the mobile device may send the server position data collected within the mobile device environment. Based on the position data received and type(s) of data to update in a particular situation, the server can provide mobile devices with an individualized Guideline (e.g., stored within a location database 220) or configuration to optimize data collection for each respective mobile device in a set or crowd of mobile devices. The server can continue to iterate through multiple Guidelines or configurations to apply on each mobile device. For example, upon a first iteration of position data collection, the server may receive sufficient WiFi data collection and send an updated Guideline or configuration to request Bluetooth or NFC position data. At a later point in time, the server may revert back to requesting WiFi data collection based on one or more triggers discussed in greater detail below.

Figure 5:
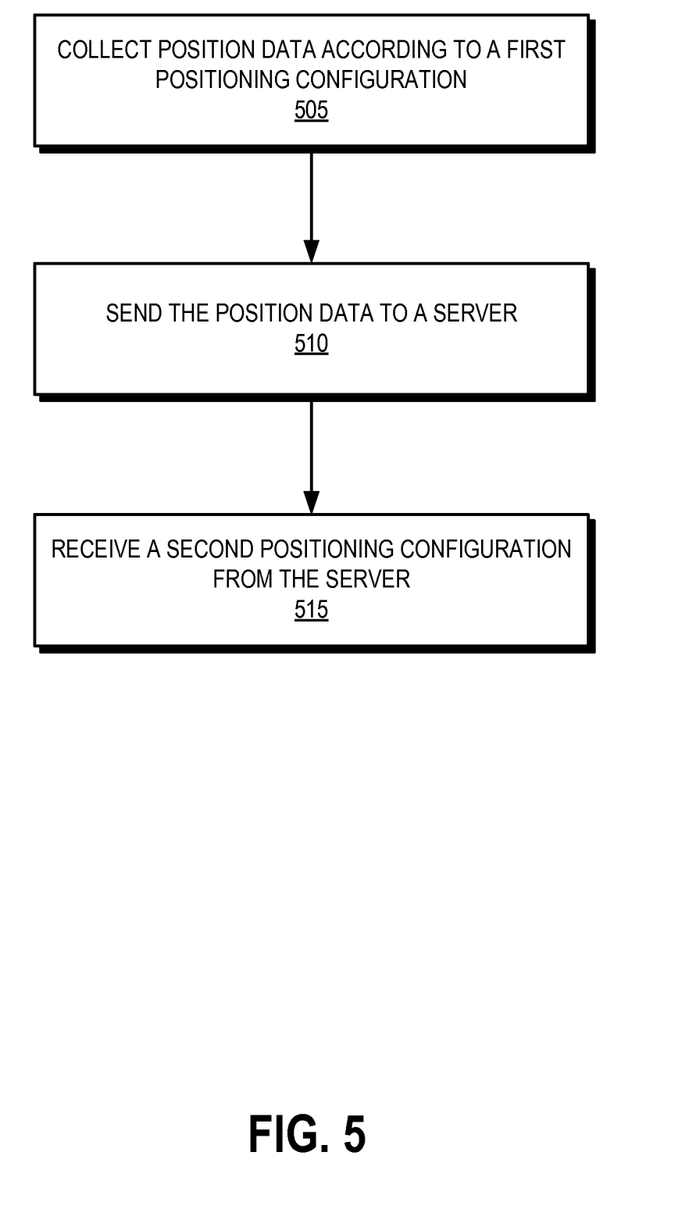
FIG. 5 is a flow diagram illustrating an exemplary method of Fine Grain Position Data Collection performed at a mobile device.

FIG. 5 is a flow diagram illustrating an exemplary method of Fine Grain Position Data Collection performed at a device (e.g., device 100). At block 505, an embodiment (e.g., FGPDC at a mobile device) can collect position data at a mobile device according to a first positioning configuration.

At block 510, the embodiment can send the position data collected according to the first positioning configuration, to a server (e.g., server 200). For example, the device may have one or more sensors available for data collection. One or more of the available sensors may be configured to collect data in the first positioning configuration. The sensors may be configured to be always on, or alternatively the configuration may specify an interval time period when the sensor may collect data. For example, the first positioning configuration may specify that a device camera sensor can capture an image every 10 seconds and send the image to a server for processing. In another example, the device may determine RSSI or RTT from one or more WiFi access points every second and send the data to the server.

At block 515, the embodiment can receive a second positioning configuration from the server. The mobile device can determine whether to use all or part of the second (recommended) positioning configuration for future data collection. For example, the server may request additional data collection using the mobile device's GPS sensor and camera sensor (or any other sensor configuration). However, the mobile device may accept, refuse, or modify, the suggested data collection configuration. For example, the mobile device can accept the recommended configuration by applying all of the recommended configuration changes (e.g., activate GPS and the camera sensor). The mobile device may also refuse the recommended configuration (e.g., keep GPS and camera sensors deactivated). In some embodiments, the mobile device may keep some aspects of the recommended configuration while applying other aspects of the recommended configuration (e.g., activating GPS while keeping a camera sensor deactivated). User settings or preferences may be one factor in determining whether all or some of a positioning configuration is implemented by the mobile device.

In one embodiment, FGPDC can read device sensor data to determine context or position. For example, a mobile device can create context data, or data related to the environment of the device by polling or extracting data from one or more of the mobile device sensors described above. As one example, the mobile device may receive positioning information from a GPS or from WiFi positioning to determine a location of the device. The mobile device may also read camera images or data from a camera sensor to determine information about the device environment (e.g., whether the device is indoors or whether any detectable landmarks are visible). Using the context data, FGPDC at the mobile device or server, can determine further information about the environment/location. For example, the mobile device may extract longitude and latitude coordinates from the GPS, and determine the coordinates are associated with a specific building or section of a building.

In one embodiment, based on positioning or location information received from each mobile device, the server can create a recommended positioning configuration or Guideline for mobile devices performing future data collections. To create the Guideline, the server may first determine what if any data gaps exist within the location database (e.g., location database 220 on the server 200).

In one embodiment, Guidelines may be stored within a location database and can include Location Data and/or recommended data collection configurations. Mobile devices (e.g., device 100) can receive a Guideline from the server. The Guideline may include information to assist the device in providing accurate positioning or localization. For example, within an indoor shopping mall, GPS positioning may be most accurate when the mobile device is positioned near windows or other openings. In this indoor shopping mall example, the FGPDC may send the device a Guideline that can include Location Data to help the device more accurately determine position within the shopping mall such that the mobile device can activate or deactivate one or more sensors as appropriate for the given location. The Location Data may include location specific features, landmarks, or identifiers as described above.

The mobile device can refer to the Guideline to optimize the positioning configuration of the mobile device. For example, if the mobile device receives a Guideline that indicates the mobile device location has few windows or other location features that promote efficient access to communication outside of the current building, the mobile device may automatically turn off GPS or other satellite communication features. If the Guideline indicates the respective location has some windows that may allow for a weak GPS signal, the mobile device may determine a GPS can be polled occasionally (e.g., reduced usage model) instead of being activated continuously (e.g., constant on model). The Guideline may include details to allow the mobile device to determine proximity to a window or open area that may potentially offer more accurate GPS signal reception.

In one embodiment, the positioning configuration or Guideline optimizes the data collection by the server, such that a mobile device can collect data on an as needed basis. The server may send a recommended positioning configuration or Guideline including specific position data collection requests from the mobile device. For example, the server may determine that Location Data for a location has incomplete or partial knowledge about the nearby WiFi access points to the mobile device. Although the mobile device may not necessarily need to collect WiFi data in order to perform user functions (e.g., navigation), the mobile device may nonetheless accept the server recommendations to help update the Location Data on the server (e.g., as part of location database). Therefore, the server may request individualized data collection from a group or "crowd" of mobile devices in order to maintain and update the location database on the server which can include various types of Location Data.

FGPDC (e.g., FGPDC functionality within the server 200) may maintain updated location features/attributes based on crowdsourcing data collection from one or more devices (e.g., mobile devices/devices). For example, as a device navigates an indoor location (e.g., shopping mall) data collected during navigation may be sent to the FGPDC server to update and maintain location features. In one embodiment, the server can use FGPDC functionality in conjunction with one or more mobile devices to crowdsource Location Data. FGPDC can intelligently throttle or adjust the amount or type of subsequent Location Data updates sent by each respective mobile device. In one embodiment, FGPDC can send a recommended configuration or Guideline related to recommended frequency of data collection, which sensors to activate, how often to send updates to the server, or what type of data to collect.

In one embodiment, a mobile device can apply a recommended positioning configuration or Guideline upon determining whether the configuration or Guideline is compatible with the respective device settings. For example, user supplied settings may restrict the use of GPS when battery is low or have privacy settings to limit the use of camera sensors even though the FGPDC (e.g., configuration file sent from the server) may recommend GPS or camera activation.

In some embodiments, a recommended configuration or Guideline from a server also includes Location Data. As used herein, Location Data may include Location Context Identifiers (LCI) or other data related to a physical location. For example, Location Data can include: a map of the location (e.g., including building or floor layout and points of interest), number of known access points, historical data traffic, device activity associated with the position or location, or other known location features.

Location Data may be subdivided into multiple sub-locations such that a user or device can download or access the section of Location Data relevant to a current location. As the user or device moves from one location to another, the Location Data related to the current location may be accessed locally or downloaded from a server. In other embodiments, the server may automatically determine related Location Data that a device may need based on direction of movement or position of the device.

In one embodiment, the Location Data stored at the server (e.g., within the location database) may be determined by a baseline data collection sequence from one or more mobile devices or a pre-seeded database. During one or more initial position data collection sessions by one or more mobile devices, FGPDC at the server may obtain Location Data as described above. Subsequent mobile device data collection received by the server can be used to maintain and keep the location database up to date. For example, upon detecting a mobile device within a respective location, the server may compare incoming data collection at that location to current Location Data on the server. If the Location Data received by the server is more up to date or adds additional Location Data, the location database at the server may be updated. The updated Location data can be used to benefit subsequent mobile device connections when the Location Data is requested by a mobile device.

In one embodiment, FGPDC (e.g., FGPDC functionality on the server) can trigger creation and sending of a recommended configuration to a device when a change in the received position data (e.g., data related to a particular location) is detected. For example, a mobile device may determine three WiFi access points are detected in a location when ten access points are expected based on prior data collection (e.g., stored within the location database at the server). Based on a change in position data indicating the mobile device has position uncertainty, the server can trigger creation of a recommended configuration or Guideline. The server can create a configuration or Guideline to recommend the mobile device to turn on additional sensors or increase the frequency of positioning calculations for subsequent data collections by one or more devices.

In one embodiment, one or more trigger events can cause FGPDC functionality at the server to create and send a recommended configuration or Guideline to a mobile device. In one embodiment, the server may receive a direct request for Location Data associated with of a particular location. For example a location (e.g., venue, shopping mall, or place of business) may change a layout of the building or floors and request an update to Location Data associated with their real world physical space. In one example, the location may have remodeled and walls or rooms that influenced the effectiveness of WiFi positioning may be missing or added since the prior position data collection. Also access points may be added or removed which could change known location features storage at the server. Upon changing the layout or features of a location, access points send out notification directly to the server of an updated connection layout. Alternatively, the location owner or manager may send a request to update position data upon a change in layout of the venue. The FGPDC (e.g., server 200) can send out the updated configuration when a mobile device approaches or enters an updated location.

In one embodiment, upon detecting a change in positioning performance of the device, FGPDC functionality at the server can trigger creation and sending of the recommended configuration or Guideline to a device. Positioning performance may relate to the ability of the mobile device to determine or infer a position or location of the mobile device (e.g., position or location may be relative to a landmark, map coordinates, or other physical space). For example, a user may complain about positioning performance in an application (e.g., a navigation application) on the device which. The poor positioning performance may be reported to the server by the application, or user. Upon receiving notification of potential degradation of positioning performance, the server can create and send a recommended configuration to improve device positioning or location determination. For example, the server may suggest turning on additional sensors to aid device positioning and navigation within the respective location (e.g., a building or floor of a building).

In one embodiment, the server triggers creation and sending of the recommended configuration to a device when a threshold amount of time has elapsed since a previous data collection. For example, the server can determine that Location Data of a particular location is outdated, and request one or more devices to provide updated Location Data. The server can send a recommended configuration or Guideline to collect the updated position data from one or more devices at the respective location outdated coverage.

In one embodiment, the FGPDC recommended configuration or Guideline can be different for each location or venue. For example, FGPDC may have a recommended configuration for a specific shopping mall and a different recommended configuration for a specific office building. Furthermore, different sections of a location may trigger different configurations or Guidelines. For example, the lobby of an office building may have different location features and higher foot traffic than an office space on a higher level of the building. Based on the different features of the respective location, the server can adjust the data collection parameters that are requested or sourced from the devices at the location.

In some embodiments, the FGPDC can determine a recommended configuration for the device according to the available features of the device (e.g., whether the device has Bluetooth, accelerometer, WiFi, or other capability used to determine position or context for the device environment). For example, one device may have Bluetooth and WiFi, while other devices may be lacking WiFi and Bluetooth but have multiple cameras or NFC. Depending on capability, different configuration settings can be sent from the server to the device (as a Guideline or configuration). For example, a GPS enabled device may be able to provide detailed positioning information to the FGPDC server. In another example, if no NFC data has been recorded for a particular location, upon determining a connected device has NFC capabilities, the FGPDC may request the device collect NFC data for the location.

In one embodiment, the FGPDC server determines a level of crowdsourcing based on amount of data collected over a period of time. Depending on the capture time of the most recent position data for a location, the next recommended configuration may be more or less data intensive, or occur earlier or later. For example, after 6 months without new or updated position data for a location, the FGPDC may resume requests for data collection at a location.

In one embodiment, when the FGPDC determines a change in positioning performance surpasses a predetermined threshold, a new recommended configuration for one or more devices can be created. For example, the FGPDC may monitor RSSI and RTT calculations for devices at a particular location. Based on changes in measurement of the RSSI and RTT for a location compared to historical levels of RSSI and RTT, the FGPDC can trigger additional or fewer sensors to aid in device positioning.

In alternate embodiments, the FGPDC may adjust the intensity or frequency of data collection for existing sensors based on a change in historical levels of RSSI and RTT. For example, an access point may fail or be removed from a location, resulting in different RSSI and RTT values from previous data collection sessions. The FGPDC may recommend additional data collection from devices based on the change in recorded RSSI and RTT. For example, additional data collection may include additional sensors or increased robustness for existing sensors.

In one embodiment, the server determines frequency of data collection. Data can be collected in any time increment, however the server can balance the need for data with the goal of minimizing the impact on client devices. Data collection may be adjusted by the server based on one or more of: time of day, day of a week, date, currently available position data collection, or time elapsed since a previous data collection. For example, the server may determine that during peak shopping hours, all of the mobile devices at a shopping mall do not need to collect and report positioning data at the same time. The server may determine that a small subset of all available mobile devices could be used to refresh position data at the server.

In one embodiment, the FGPDC can have devices store updated context data in local memory, and the devices send the data from memory to the server when a WiFi connection is available. For example, instead of immediately uploading data at the location (e.g., over a cellular data connection), a device may delay sending data until the device is connected to a network with WiFi. In some embodiments, data uploads may occur when the device is connected to a power source (e.g., charging cable is attached).

In one embodiment, devices connected to the FGPDC server can self configure with an updated configuration. Devices may use some or none of the recommended configurations from the server when implementing a new data collection configuration. For example, FGPDC functionality at the server may request in a recommended configuration, that a device collect GPS data and send to the server. However the device may be low on battery and the device may determine that GPS should remain deactivated until the device battery can be recharged. In some embodiments, the server can receive a battery level (e.g., or any other status) from the device and create a customized recommended configuration according to battery level (or other status) of the particular device.

FGPDC may be implemented as software, firmware, hardware, module, or engine. In one embodiment, the previous FGPDC description may be implemented by one or more general purpose processors (e.g., processor 161) in device 100 in memory 105 to achieve the previously desired functions (e.g., the method of FIG. 4). In one embodiment, the previous FGPDC description may be implemented by one or more general purpose processors (e.g., processor 210) in memory 240 of server 200 to achieve the previously desired functions (e.g., the method of FIG. 5).

The teachings herein may be incorporated into (e.g., implemented within or performed by) a variety of apparatuses (e.g., devices). For example, one or more aspects taught herein may be incorporated into a phone (e.g., a cellular phone), a personal data assistant, a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements and may result in different power profiles generated for each interest point or set of interest points.

In some aspects a wireless device may comprise an access device (e.g., a Wi-Fi access point) for a communication system. Such an access device may provide, for example, connectivity to another network through transceiver 140 (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions or modules described may be implemented in hardware (e.g., hardware 162), software (e.g., software 165), firmware (e.g., firmware 163), or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the disclosure is not limited to the embodiments shown herein but is to be accorded the widest scope consistent with the principles and novel features disclosed herein.

What is claimed is:

1. A method for position data collection by a server, the method comprising:
    receiving, at the server, first position data collected by a mobile device using a first set of one or more mobile device sensors of a plurality of mobile device sensors;
    determining, from the first position data received at the server, a mobile device position;
    creating, by the server, a positioning configuration created according to at least the mobile device position, the positioning configuration including a request for the mobile device to activate a second set of one or more mobile device sensors of the plurality of mobile device sensors to use to collect second position data, the second set of one or more mobile device sensors including at least one different mobile device sensor than the first set of one or more mobile device sensors used to collect the first position data;
    sending, by the server, the positioning configuration to the mobile device; and
    receiving, at the server, the second position data collected by the mobile device using the second set of one or more mobile device sensors according to the positioning configuration.

2. The method of claim 1, further comprising:
    creating the positioning configuration according to prior position data received at the server, the prior position data associated with the mobile device position.

3. The method of claim 1, wherein creating the positioning configuration further comprises determining available mobile device sensors.

4. The method of claim 1, wherein creating the positioning configuration further comprises comparing previously stored position data collected at the server to the first position data received from the mobile device.

5. The method of claim 1, wherein the mobile device position comprises a predetermined section within an indoor location.

6. The method of claim 1, wherein creating the positioning configuration is triggered by one or more of:
    a change in the received first position data from previous position data,
    a request associated with a location,
    a change in positioning performance of the mobile device, or
    an amount of time elapsed since a previous position data collection by the server.

7. The method of claim 1, wherein the positioning configuration comprises parameters including a type or frequency of data collection by the mobile device, and wherein the type or frequency of data collection is based on one or more of: time of day, day of a week, date, currently available position data collection, or time elapsed since a previous data collection.

8. The method of claim 1, wherein upon determining the mobile device position, the server sends data related to a next likely mobile device position, wherein the next likely mobile device position is an adjacent or nearby location accessible from the mobile device position.

9. The method of claim 1, wherein the positioning configuration is a subsequent positioning configuration sent by the server after a previous positioning configuration.

10. The method of claim 9, the subsequent positioning configuration indicating at least one mobile device sensor excluded from the previous positioning configuration.

11. The method of claim 1, the positioning configuration further including a request for the mobile device to deactivate at least one of the first set of one or more mobile device sensors.

12. A method for position data collection by a mobile device, the method comprising:
    collecting, by the mobile device using a first set of one or more mobile device sensors of a plurality of mobile device sensors, first position data;
    sending, by the mobile device, the first position data to a server;
    receiving, at the mobile device, a positioning configuration from the server, the positioning configuration created according to at least a mobile device position based on the first position data and the positioning configuration including a request for the mobile device to activate a second set of one or more mobile device sensors of the plurality of mobile device sensors to use to collect second position data, the second set of one or more mobile device sensors including at least one different mobile device sensor than the first set of one or more mobile device sensors used to collect the first position data; and
    sending, by the mobile device, the second position data to the server, the second position data collected by the mobile device using the second set of one or more mobile device sensors according to the positioning configuration.

13. The method of claim 12, wherein the mobile device independently determines whether to apply all or some of the positioning configuration received from the server.

14. The method of claim 12, wherein the positioning configuration is created based at least in part on prior position data received at the server.

15. The method of claim 12, wherein the positioning configuration causes the mobile device to perform one or more of:
  deactivating one or more of the first set of one or more mobile device sensors,
  increasing or decreasing an amount of position data collected by the mobile device,
  increasing or decreasing a position data collection frequency of the mobile device, or
  increasing or decreasing an amount of position data sent from the mobile device to the server.

16. The method of claim 12, wherein the positioning configuration comprises parameters including a type or frequency of data collection by the mobile device, and wherein the type or frequency of data collection is based on one or more of: time of day, day of a week, date, currently available position data collection, or time elapsed since a previous data collection.

17. The method of claim 12, wherein the plurality of mobile device sensors includes a Global Positioning Sensor, accelerometer, camera sensor, WiFi, Bluetooth sensor, cellular network, or Near Field Communication sensor, or any combination thereof.

18. A machine readable non-transitory storage medium containing executable program instructions which cause a data processing device to perform a method, the data processing device comprising a server and the method comprising:
  receiving, at the server, first position data collected by a mobile device using a first set of one or more mobile device sensors of a plurality of mobile device sensors;
  determining, from the first position data received at the server, a mobile device position;
  creating, by the server, a positioning configuration created according to at least the mobile device position, the positioning configuration including a request for the mobile device to activate a second set of one or more mobile device sensors of the plurality of mobile device sensors to use to collect second position data, the second set of one or more mobile device sensors including at least one different mobile device sensor than the first set of one or more mobile device sensors used to collect the first position data;
  sending, by the server, the positioning configuration to the mobile device; and
  receiving, at the server, the second position data collected by the mobile device using the second set of one or more mobile device sensors according to the positioning configuration.

19. The medium of claim 18, wherein the method further comprises:
  creating the positioning configuration according to prior position data received at the server, the prior position data associated with the mobile device position.

20. The medium of claim 18, wherein creating the positioning configuration further comprises determining available mobile device sensors.

21. The medium of claim 18, wherein creating the positioning configuration further comprises comparing previously stored position data collected at the server to the first position data received from the mobile device.

22. The medium of claim 18, wherein the mobile device position comprises a predetermined section within an indoor location.

23. The medium of claim 18, wherein creating the positioning configuration is triggered by one or more of:
  a change in the received first position data from previous position data,
  a request associated with a location,
  a change in positioning performance of the mobile device, or
  an amount of time elapsed since a previous position data collection by the server.

24. The medium of claim 18, wherein the positioning configuration comprises parameters including a type or frequency of data collection by the mobile device, and wherein the type or frequency of data collection is based on one or more of: time of day, day of a week, date, currently available position data collection, or time elapsed since a previous data collection.

25. The medium of claim 18, wherein upon determining the mobile device position, the server sends data related to a next likely mobile device position, wherein the next likely mobile device position is an adjacent or nearby location accessible from the mobile device position.

26. A machine readable non-transitory storage medium containing executable program instructions which cause a data processing device to perform a method, the data processing device comprising a mobile device and the method comprising:
  collecting, by the mobile device using a first set of one or more mobile device sensors of a plurality of mobile device sensors, first position data;
  sending, by the mobile device, the first position data to a server;
  receiving, at the mobile device, a positioning configuration from the server, the positioning configuration created according to at least a mobile device position based on the first position data and the positioning configuration including a request for the mobile device to activate a second set of one or more mobile device sensors of the plurality of mobile device sensors to use to collect second position data, the second set of one or more mobile device sensors including at least one different mobile device sensor than the first set of one or more mobile device sensors used to collect the first position data; and
  sending, by the mobile device, the second position data to the server, the second position data collected by the mobile device using the second set of one or more mobile device sensors according to the positioning configuration.

27. The medium of claim 26, wherein the mobile device independently determines whether to apply all or some of the positioning configuration received from the server.

28. The medium of claim 26, wherein the positioning configuration is created based at least in part on prior position data received at the server.

29. The medium of claim 26, wherein the positioning configuration causes the mobile device to perform one or more of:
  deactivating one or more of the first set of one or more mobile device sensors,
  increasing or decreasing an amount of position data collected by the mobile device,
  increasing or decreasing a position data collection frequency of the mobile device, or
  increasing or decreasing an amount of position data sent from the mobile device to the server.

30. The medium of claim 26, wherein the positioning configuration comprises parameters including a type or frequency of data collection by the mobile device, and wherein the type or frequency of data collection is based on one or more of: time of day, day of a week, date, currently available position data collection, or time elapsed since a previous data collection.

31. The medium of claim 26, wherein the plurality of mobile device sensors includes a Global Positioning Sensor, accelerometer, camera sensor, WiFi, Bluetooth sensor, cellular network, or Near Field Communication sensor, or any combination thereof.

32. A server for remote data collection, the server comprising:
   a processor; and
   a storage device coupled to the processor and storing instructions, which, when executed by the processor cause the processor to:
      receive first position data collected by a mobile device using a first set of one or more mobile device sensors of a plurality of mobile device sensors;
      determine, from the first position data received at the server, a mobile device position;
      create a positioning configuration according to at least the mobile device position, the positioning configuration including a request for the mobile device to activate a second set of one or more mobile device sensors of the plurality of mobile device sensors to use to collect second position data, the second set of one or more mobile device sensors including at least one different mobile device sensor than the first set of one or more mobile device sensors used to collect the first position data;
      send the positioning configuration to the mobile device; and
      receive the second position data collected by the mobile device using the second set of one or more mobile device sensors according to the positioning configuration.

33. The server of claim 32, wherein the instructions further cause the processor to:
   create the positioning configuration according to prior position data received at the server, the prior position data associated with the mobile device position.

34. The server of claim 32, wherein to create the positioning configuration the instructions cause the processor to determine available mobile device sensors.

35. The server of claim 32, wherein to create the positioning configuration the instructions cause the processor to compare previously stored position data collected at the server to the first position data received from the mobile device.

36. The server of claim 32, wherein the mobile device position comprises a predetermined section within an indoor location.

37. The server of claim 32, wherein the instructions cause the processor to create the positioning configuration in response to one or more of:
   a change in the received first position data from previous position data,
   a request associated with a location,
   a change in positioning performance of the mobile device, or
   an amount of time elapsed since a previous position data collection by the server.

38. The server of claim 32, wherein the positioning configuration comprises parameters including a type or frequency of data collection by the mobile device, and wherein the type or frequency of data collection is based on one or more of: time of day, day of a week, date, currently available position data collection, or time elapsed since a previous data collection.

39. The server of claim 32, wherein upon determining the mobile device position, the server sends data related to a next likely mobile device position, wherein the next likely mobile device position is an adjacent or nearby location accessible from the mobile device position.

40. A mobile device comprising:
   a processor; and
   a storage device coupled to the processor and configurable for storing instructions, which, when executed by the processor cause the processor to:
      collect first position data using a first set of one or more mobile device sensors of a plurality of mobile device sensors;
      send the first position data to a server;
      receive a positioning configuration from the server, the positioning configuration created according to at least a mobile device position based on the first position data and the positioning configuration including a request for the mobile device to activate a second set of one or more mobile device sensors of the plurality of mobile device sensors to use to collect second position data, the second set of one or more mobile device sensors including at least one different mobile device sensor than the first set of one or more mobile device sensors used to collect the first position data; and
      send the second position data to the server, the second position data collected by the mobile device using the second set of one or more mobile device sensors according to the positioning configuration.

41. The mobile device of claim 40, wherein the mobile device independently determines whether to apply all or some of the positioning configuration received from the server.

42. The mobile device of claim 40, wherein the positioning configuration is created based at least in part on prior position data received at the server.

43. The mobile device of claim 40, wherein the positioning configuration causes the mobile device to perform one or more of:
   deactivating one or more of the first set of one or more mobile device sensors,
   increasing or decreasing an amount of position data collected by the mobile device,
   increasing or decreasing a position data collection frequency of the mobile device, or increasing or decreasing an amount of position data sent from the mobile device to the server.

44. The mobile device of claim 40, wherein the positioning configuration comprises parameters including a type or frequency of data collection by the mobile device, and wherein the type or frequency of data collection is based on one or more of: time of day, day of a week, date, currently available position data collection, or time elapsed since a previous data collection.

45. The mobile device of claim 40, wherein the plurality of mobile device sensors includes a Global Positioning Sensor, accelerometer, camera sensor, WiFi, Bluetooth sensor, cellular network, or Near Field Communication sensor, or any combination thereof.

46. A server comprising:
   means for receiving first position data collected by a mobile device using a first set of one or more mobile device sensors of a plurality of mobile device sensors;

means for determining, from the first position data, a mobile device position;

means for creating a positioning configuration according to at least the mobile device position, the positioning configuration including a request for the mobile device to activate a second set of one or more mobile device sensors of the plurality of mobile device sensors to use to collect second position data, the second set of one or more mobile device sensors including at least one different mobile device sensor than the first set of one or more mobile device sensors used to collect the first position data;

means for sending the positioning configuration to the mobile device; and means for receiving the second position data collected by the mobile device using the second set of one or more mobile device sensors according to the positioning configuration.

47. The server of claim 46, further comprising:
means for creating the positioning configuration according to prior position data received by the means for receiving, the prior position data associated with the mobile device position.

48. The server of claim 46, wherein the means for creating the positioning configuration comprises means for determining available mobile device sensors.

49. The server of claim 46, wherein the means for creating the positioning configuration comprises means for comparing previously stored position data collected at the server to the first position data received from the mobile device.

50. The server of claim 46, wherein the mobile device position comprises a predetermined section within an indoor location.

51. The server of claim 46, wherein the means for creating the positioning configuration is triggered by one or more of:
a change in the received first position data from previous position data,
a request associated with a location,
a change in positioning performance of the mobile device, or
an amount of time elapsed since a previous position data collection by the server.

52. The server of claim 46, wherein the positioning configuration comprises parameters including a type or frequency of data collection by the mobile device, and wherein the type or frequency of data collection is based on one or more of: time of day, day of a week, date, currently available position data collection, or time elapsed since a previous data collection.

53. The server of claim 46, wherein upon determining the mobile device position, the server sends data related to a next likely mobile device position, wherein the next likely mobile device position is an adjacent or nearby location accessible from the mobile device position.

54. A mobile device comprising:
means for collecting first position data using a first set of one or more mobile device sensors of a plurality of mobile device sensors;
means for sending the first position data to a server;
means for receiving a positioning configuration from the server, the positioning configuration created according to at least a mobile device position based on the first position data and the positioning configuration including a request for the mobile device to activate a second set of one or more mobile device sensors of the plurality of mobile device sensors to use to collect second position data, the second set of one or more mobile device sensors including at least one different mobile device sensor than the first set of one or more mobile device sensors used to collect the first position data; and
means for sending the second position data to the server, the second position data collected by the mobile device using the second set of one or more mobile device sensors according to the positioning configuration.

55. The mobile device of claim 54, wherein the mobile device independently determines whether to apply all or some of the positioning configuration received from the server.

56. The mobile device of claim 54, wherein the positioning configuration is created based at least in part on prior position data received at the server.

57. The mobile device of claim 54, wherein the positioning configuration causes the mobile device to perform one or more of:
deactivating one or more of the first set of one or more mobile device sensors,
increasing or decreasing an amount of position data collected by the mobile device,
increasing or decreasing a position data collection frequency of the mobile device, or
increasing or decreasing an amount of position data sent from the mobile device to the server.

58. The mobile device of claim 54, wherein the positioning configuration comprises parameters including a type or frequency of data collection by the mobile device, and wherein the type or frequency of data collection is based on one or more of: time of day, day of a week, date, currently available position data collection, or time elapsed since a previous data collection.

59. The mobile device of claim 54, wherein the plurality of mobile device sensors includes a Global Positioning Sensor, accelerometer, camera sensor, WiFi, Bluetooth sensor, cellular network, or Near Field Communication sensor, or any combination thereof.

* * * * *